United States Patent [19]

Briggs, Jr. et al.

[11] 4,106,971
[45] Aug. 15, 1978

[54] METHOD OF ADHESIVE BONDING

[75] Inventors: Paul Clayton Briggs, Jr., Wilmington; Lawrence Carl Muschiatti, Newark, both of Del.

[73] Assignee: E. I. Du Pont de Nemours and Company, Wilmington, Del.

[21] Appl. No.: 770,059

[22] Filed: Feb. 18, 1977

Related U.S. Application Data

[60] Division of Ser. No. 551,964, Feb. 21, 1975, abandoned, which is a division of Ser. No. 357,387, May 4, 1974, Pat. No. 3,890,407, and a continuation-in-part of Ser. No. 273,353, Jul. 20, 1972, abandoned.

[51] Int. Cl.² ............................................... B32B 7/00
[52] U.S. Cl. .................................. 156/310; 156/314; 156/333; 427/302; 428/463; 428/522
[58] Field of Search ............... 156/310, 332, 314, 333, 156/315; 427/302; 428/463, 522; 260/878 R, 884, 885

[56] References Cited

U.S. PATENT DOCUMENTS

| | | | |
|---|---|---|---|
| 2,407,143 | 9/1946 | Daur et al. | 260/885 |
| 2,994,632 | 8/1961 | Brown et al. | 428/463 |
| 3,262,803 | 7/1966 | Bader et al. | 260/885 |
| 3,616,040 | 10/1971 | Toback | 156/310 |

FOREIGN PATENT DOCUMENTS

| | | | |
|---|---|---|---|
| 1,077,083 | 7/1967 | United Kingdom. | |
| 592,325 | 9/1947 | United Kingdom | 156/333 |

*Primary Examiner*—William A. Powell
*Assistant Examiner*—J. J. Gallagher

[57] ABSTRACT

Solutions of chlorosulfonated polyethylene or mixtures of sulfonyl chlorides and chlorinated polymers in polymerizable vinyl monomers having a Brookfield viscosity of up to about 1 million form excellent adhesive compositions which cure to high bond strengths. Acrylic monomers are preferred.

5 Claims, No Drawings

METHOD OF ADHESIVE BONDING

REFERENCE TO RELATED APPLICATIONS

This application is a division of application Ser. No. 551,964, filed Feb. 21, 1975, now abandoned which in turn is a division of application Ser. No. 357,387, filed May 4, 1974, now U.S. Pat. No. 3,890,407, which in turn is a continuation-in-part of application Ser. No. 273,353, filed July 20, 1972, now abandoned.

BACKGROUND OF THE INVENTION

U.S. Pat. No. 3,591,438 discloses a polymerizable acrylate composition comprising an adhesive composition and bonding accelerator, wherein the adhesive composition is a polymerizable acrylate ester monomer and a peroxy polymerization initiator, while the bonding accelerator is composed of an amine-aldehyde condensation product and a reducing activator.

U.S. Pat. No. 3,594,451 describes an elastomeric graft polymer of an amorphous, homogeneously chlorosulfonated polyethylene having grated thereon polymer chains derived from various vinyl monomers, the weight of the grafted chains being 10-40 weight percent of the chlorosulfonated polyethylene.

Grafting of methyl methacrylate on chlorosulfonated polyethylene also has been studied by Sato et al., Makromol. Chemie 153, 47 (1972).

U.S. Pat. No. 3,642,750 discloses a sealing composition comprising an acrylic acid ester, a cycloaliphatic monohydric alcohol derived from dimerized or polymerized cyclopentadiene, and an organic peroxide. Such mixtures are very stable in the presence of oxygen but harden in the absence of air or oxygen.

Another sealing system, described in U.S. Pat. No. 3,203,941, is based on tetraethyleneglycol dimethacrylate, a polyamino compound, and an organic acid.

The prior art adhesive compositions based on a polymerizable vinyl monomer have some shortcomings; for instance, they frequently are unstable in storage or require long curing times, or do not give strong bonds, or require work in the absence of air. There is a need, therefore, for an adhesive that is storage-stable, can be conveniently formulated and applied, and gives strong bonds in a short time.

SUMMARY OF THE INVENTION

According to this invention, there is now provided an adhesive composition which can be formulated either as a two-part system or as a system utilizing a primer. In either case, the critical components of the adhesive composition of the present invention are a solution of a sulfur-bearing composition selected from chlorosulfonated polyethylene and a mixture of sulfonyl chloride with chlorinated polyethylene in a polymerizable vinyl monomer or a mixture of monomers and a polymerization catalyst.

The sulfur-bearing composition should contain about 25-70 weight percent chlorine and about 3-160 mmoles sulfonyl chloride moiety per 100 grams of polymer and the polyethylene from which the chlorosulfonated or chlorinated polyethylene is prepared should have a melt index of about 4-500. The solution can have a Brookfield viscosity of up to about 1 million.

DETAILED DESCRIPTION OF THE INVENTION

For the purposes of this invention, the term "polymerization catalyst" means at least one of the following:
(a) a free radical generator,
(b) an initiator
(c) a promoter,
(d) an accelerator.

An initiator is a tertiary amine, for example, N,N-dimethylaniline, N,N-dimethyltoluidine, N,N-diethylaniline, N,N-diisopropyl (p-toluidine) or a guanidine.

A promoter is an organic salt of a transition metal; for example, cobalt, nickel, manganese, or iron naphthenate, copper octoate, iron hexoate, or iron propionate.

An accelerator is an aldehyde-amine condensation product, such as a condensation product of butyraldehyde with a primary amine, for instance, with aniline or butylamine. In general, the condensation products of aliphatic aldehydes with aliphatic or aromatic amines are useful.

A free radical generator can be an organic peroxide, an organic hydroperoxide, a perester, or a peracid.

Suitable polymerizable vinyl monomers for the purpose of this invention include acrylic monomers and mixtures of monomers, such as methyl methacrylate, ethyl methacrylate, acrylonitrile, methacrylonitrile, methyl acrylate, ethyl acrylate, butyl methacrylate, cyclohexyl methacrylate, hexyl methacrylate, 2-ethylhexyl methacrylate, lauryl methacrylate, butyl acrylate, cyclohexyl acrylate, hexyl acrylate, 2-ethylhexyl acrylate, lauryl acrylate, methacrylic acid, acrylic acid, glycidyl methacrylate, itaconic acid, ethylene glycol and higher-glycol acrylates and methacrylates, acrylamide, and methacrylamide; halogenated monomers such as vinylidene chloride, chlorostyrene, 2,3-dichloro-1,3-butadiene, and 2-chloro-1,3-butadiene; and styrene and mono- and polyalkylstyrenes, such as methylstyrene, dimethylstyrene, ethylstyrene, or tert-butylstyrene. The preferred monomers are acrylic monomers, especially lower alkyl acrylates and methacrylates and ethylene glycol diacrylate and dimethacrylate.

The choice of the monomer will, of course, depend to some extent on the desired bond rheology, as well as the solubility of the chlorosulfonated or chlorinated polyethylene in the monomer. Solutions having a Brookfield viscosity of more than about 1 million cps (ASTM V 490.0500) are impractical to handle. When rigid assemblies having high shear strength are required, the monomer mixture should have a high glass transition temperature, for example, using methyl methacrylate of a glass transition temperature of 105° C. For more flexible structures, e.g., where the adhesive layer is intended to contribute to vibration dampening at room temperature, a glass transition temperature of the combined copolymer of about −20° C. is preferred.

The chlorosulfonated polyethylene suitable in the process of the present invention can be prepared in a manner well known to those skilled in the art by reaction of linear or branched polyethylene and sulfuryl chloride, or sulfur dioxide and chlorine. Chlorosulfonated polyethylene is also available commercially, for example, under the trade name Hypalon ®. In practice, the chlorosulfonated polyethylene may also be a chlorosulfonated copolymer of ethylene with small proportions of propylene or other olefins. Various chlorosulfonated polyethylenes and methods of their preparation are discussed, for example, in U.S. Pat. No. 2,982,759, which is incorporated herein by reference. Alternatively, sulfonyl chloride and chlorinated polyethylenes of suitable molecular weight can be used. The sulfonyl chlorides can be mono- or poly-functional and can be $C_1$–$C_{12}$ alkyl sulfonyl chlorides, such as methane or butane sulfonyl chloride, $C_6$–$C_{24}$ aromatic sulfonyl chlorides such as benzene or toluene sulfonyl chloride. Some sulfonyl chlorides containing hetero atoms have also been found to work, such as diphenylether-4,4'-disulfonyl chloride.

The relative proportions of chlorosulfonated polyethylene and polymerizable vinyl monomer can vary within a rather broad range. In the case of acrylic polymers, the practical range is about from 25 to 2000 parts by weight of the monomer per 100 parts of chlorosulfonated or chlorinated polyethylene. The preferred range is 50–500 parts by weight of the monomer per 100 parts of polymer, whether chlorosulfonated polyethylene or a mixture of sulfonyl chloride and chlorinated polyethylene is used.

The adhesive compositions of the present invention require a polymerization catalyst to cause hardening of the composition within a practical time. One or more of the catalysts described in the Summary of the Invention can be used, but the following catalysts or catalyst combinations are particularly suitable:
(a) an initiator plus a promoter,
(b) an accelerator,
(c) a free radical generator and an initiator plus a promoter, and
(d) a free radical generator and an accelerator Free radical generators are well known to those skilled in the art and are described, for example, in "Free Radicals in Solution", C. Walling, J. Wiley & Sons, New York, 1957, and in "The Chemistry of Organic Film Formers", D. H. Solomon, J. Wiley and Sons, New York, 1967, p. 135 ff.

The preferred free radical generators are organic peroxides and hydroperoxides.

An amine initiator is usually used together with a transition metal compound as a promoter. Their respective relative weight proportions should be about be about 4:1 to 1:1. The preferred proportion is about 2:1 by weight of the initiator to the promoter. It is also possible to use an initiator or promoter alone, but the combination is much more effective. The preferred initiator is N,N-dimethylaniline, while the preferred promotor is cobalt naphthenate.

Various aldehydes and amines are suitable for the preparation of accelerators useful in the present invention. The aldehydes will preferably be aliphatic aldehydes having 1–12 carbon atoms. Any primary aliphatic or aromatic amine having up to about eighteen carbon atoms is suitable. Several useful accelerators are described in the above cited U.S. Pat. No. 3,591,438.

Typical aldehydes include, for example, acetaldehyde, butyraldehyde, propionaldehyde, cyclopentanal, hexanal, cyclohexanal, hydrocinnamaldehydes, heptanal, decanal, and dodecanal. Typical amines include, for example, ethylamine, butylamine, pentylamine, cyclopentylamine, hexylamine, cyclohexylamine, octylamine, decylamine, dodecylamine, hexadecylamine, octadecylamine, aniline, tolyl amines, and xylyl amines. In both the aldehyde and the amine series, various-position isomers are possible.

The proportion of the polymerization catalyst will affect the set time of the composition. In the absence of the accelerator, a composition containing about 0.2 weight percent of a peroxide is stable for about two weeks. In the absence of a catalyst, a solution of chlorosulfonated polyethylene, for example, in a monomer is stable for at least several months under normal storage conditions. In the presence of both a free radical generator and an accelerator, the maximum bond strength can be reached within about 3–5 minutes at room temperature. It is one of the advantages of the present system that it cures quickly to a strong bond at room temperature, no aftertreatment being required.

The following concentrations of polymerization catalysts, as weight percent of the solution of polymer in monomer have been found to be practical:
free radical generator up to 10%, 0.05–3% being preferred;
accelerator up to 15%, 0.01–1.5% being preferred;
initiator up to 5%; 0.01–1.5% being preferred; and
promotor up to 5%, 0.01–0.75% being preferred.

The adhesive compositions of the present invention can be formulated as a two-part system, wherein one part is a solution of polymer in a polymerizable vinyl monomer. The other part is the polymerization catalyst. Alternatively, it can be formulated as a primer system in which the polymerization catalyst is the primer and the adhesive solution is the polymer mixture. Usually, the catalyst will be either an accelerator or an initiator plus promoter. The curing rates can be increased by adding a free radical generator to either composition. In general, at any level of the polymerization catalyst, the rate of bond formation of a system employing an initiator plus promoter is lower than the rate of bond formation of a system employing only an accelerator.

The two-part system gives very strong bonds of 2500–3500 psi lap shear. The two-part system using only an accelerator has a very short pot life. If an initiator and a promoter are used instead of an accelerator, the system's pot life can be extended. In practice, one or both surfaces to be joined are coated with the adhesive composition obtained by mixing both parts, and the surfaces are then placed in contact with each other.

In the primer system, a primer is first applied to one or both surfaces to be joined; then a solution of polymer in a vinyl monomer is applied to at least one of the surfaces. The solution can optionally contain a free radical generator. The primer is an accelerator, as defined above.

The primer system is operationally more convenient than the two-part system, and it gives a good bond strength of about 2500–3500 psi in shear when cured. Furthermore, it gives more rapid development of load-bearing strength.

The setting times for the two-part system and for the primer system will vary somewhat, depending on the nature of the catalyst, but usually will be about 5–10 min. for the former and 0.5–5 min. for the latter.

It is very unexpected that the adhesive compositions of the present invention have their unique property of setting within a short time to give bonds of high load strength. For example, when the sulfonyl chloride groups are excluded from the composition, the cure time is considerably longer. However, the role of the sulfonyl chloride or chlorosulfonated polyethylene appears to be more complex than just providing some of the adhesive material. Solutions of polymers in vinyl monomers in the absence of sulfonyl chloride groups fail to produce adhesive compositions like those of this invention when applied to substrates and tested. It is possible, in view of the above-mentioned Sato et al. publication and U.S. Pat. No. 3,594,451 that some polymerization of the monomer on the sulfonyl chloride groups takes place initially and that this polymerization in some manner also initiates the polymerization of the monomer. However, no scientific theory or explanation is offered, since the exact mechanism of this polymerization is not well understood. It is well known, for example, that monomers can be grafted on virtually any polymeric material under proper conditions, but only sulfonyl chloride groups are suitable in the adhesive compositions of this invention.

The instant compositions offer several additional advantages. Thus, they are used at room temperature, no heat being required either for applying the compositions to the substrates or for curing. They can be used on porous surfaces, unlike those prior art adhesives which require the absence of air and thus cannot be used on surfaces containing air in their pores. The bonds containing elastomeric polymers such as chlorosulfonated polyethylene are flexible. The instant compositions do not require a careful surface preparation but can be used, for example, on bonderized or oily steel.

Other possible substrates which can be bonded by means of the compositions of this invention include ordinary steel, etched aluminum, copper, brass, polar polymeric materials, (i.e., those having various functional groups, e.g., polyesters, polyamides, polyurethanes, polyvinyl chloride, etc.), wood, prepainted surfaces, glass and paper.

This invention is now illustrated by the following examples of certain preferred embodiments thereof, wherein all parts, proportions, and percentages are by weight unless otherwise indicated.

EXAMPLE 1

To a mixture of acrylic monomers comprising 85 g of methyl methacrylate (containing 50-90 ppm of hydroquinone inhibitor), 15 g of glacial methacrylic acid (containing 250 ppm of 4-methoxyphenol), and 2 g of ethylene glycol dimethacrylate, there was added 100 g of chlorosulfonated polyethylene, made from branched polyethylene having a melt index of 100 and containing 43% chlorine and 34 mmoles sulfonyl chloride/100 grams of polymer. The mixture was rolled in a jar at room temperature until solution of the polymer was complete (24-48 hours).

An adhesive composition was prepared by stirring into 50 g of the above solution, in turn, 1.5 g of cumene hydroperoxide and 0.5 g of N,N-dimethylaniline.

Lap shear bonds were prepared by pressing a small amount of the adhesive composition between 1 inch × 3 inch × 0.064 inch grit blasted and perchloroethylene vapor degreased hot rolled steel coupons in a mold so that a glue line of 0.010 inch × 1 inch × 1 inch was obtained. The specimens were stored for 18 hours in a nitrogen atmosphere (optional) and fourteen days in air at room temperature. The specimens were tested in shear at a separation rate of 0.5 inch/minute and failed adhesively at 2850 psi (ASTM D-1002-64).

Aluminum "T" peel specimens were prepared by pressing the adhesive composition between 1 inch × 10 inch × 0.018 inch etched aluminum strips so that a glue line thickness of 0.005-0.010 inch was obtained. The samples were stored as described above and tested in 180° peel at a separation speed of 10 inches per minute (ASTM D-1876-61T). The average peel strength obtained was 35 pounds per linear inch with mixed adhesive and cohesive failure.

EXAMPLE 2

A second, shelf-stable adhesive composition was prepared by stirring 0.130 g of cumene hydroperoxide into 65.3 g of the chlorosulfonated polyethylene/acrylic monomers solution described in Example 1. Lap shear bonds were prepared by applying to steel coupons (treated as described in Example 1) an accelerator which was a mixture of butyraldehyde and aniline condensation products (sold as DuPont Accelerator 808). The accelerator was applied with a cotton swab and then wiped to a thin film with a piece of cloth. The adhesive was pressed between the treated steel coupons to give a layer 0.005-0.010 inch thick. The following rate of shear strength development was observed:

Table I

| Time (min.) | Lap Shear Strength (psi) |
|---|---|
| 3 | 1450 |
| 10 | 2030 |
| 30 | 2050 |
| 60 | 2100 |

EXAMPLES 3-8

Polymer solutions containing the following were prepared as described in Example 1:

100 g chlorosulfonated polyethylene (the polymer described in Example 1) and the acrylic monomer listed for each example in the table. Adhesive compositions were prepared as follows: to 25 g of each solution were added 0.125 g cumene hydroperoxide, 0.06 g N,N-dimethylaniline, and 0.04 g cobalt napthenate. Lap shear and T-peel test assemblies were then prepared as described in Example 1. The test results are shown in the table, below:

Table II

| Example | Monomer Compositions | Lap Shear (psi) | T-Peel (pli) |
|---|---|---|---|
| 3 | Methyl methacrylate 100 | 1100 | * |
| 4 | Ethyl methacrylate 100 | 1725 | * |
| 5 | Methacrylic acid 10 Methyl methacrylate 90 | 2650 | 19 |
| 6 | N-butyl methacrylate 90 Methacrylic acid 10 | 2500 | 15 |
| 7 | Methacrylic acid 10 Methyl methacrylate 45 N-butyl methacrylate 45 | 2850 | 5.0 |
| 8 | Methacrylic acid 10 Methyl methacrylate 45 2-Ethylhexylmethacrylate 45 | 2780 | 22 |

*Not tested

EXAMPLES 9-13

Adhesive compositions were prepared as described below and the peak temperature of the exothermic polymerization was measured, as was the time to achieve that temperature. Polymer solutions containing the following were prepared as described in Example 1:

40 g of chlorosulfonated polyethylene made from polyethylene characterized in columns 2 and 3 of Table III below, 145 g methyl methacrylate, 15 g methacrylic acid, and 3.2 g ethylene glycol dimethacrylate. Adhesive compositions were prepared by adding 0.3 g of the butyraldehydeaniline condensation product described in Example 2 to 25 g of the polymer solution. The results in Table III show that all these compositions are suitable as rapid setting adhesives.

Table III

| Example | Polyethylene | Melt Index | Chlorosulfonated Polyethylene % Cl | SO$_2$Cl* | Time | Peak Temperature |
|---|---|---|---|---|---|---|
| 9 | Branched | 10 | 29 | 44 | 20 min. | 97.5 °C. |
| 10 | Branched | 100 | 43 | 34 | 32 min. | 77 °C. |
| 11 | Linear | 12–14 | 35 | 31 | 29 min. | 104 °C. |
| 12 | Linear | 5.0 | 35 | 31 | 28 min. | 105 °C. |
| 13 | Linear | 14–15 | 43 | 31 | 18.5 min. | 105 °C |

*mmoles/100 g polymer

EXAMPLE 14

Steel coupons were bonded by the primer technique of Example 2 using an adhesive composition based on methyl methacrylate, methacrylic acid, ethylene glycol dimethacrylate, and chlorosulfonated polyethylene, as in Example 1. The solution contained no polymerization catalyst. The following lap shear strengths were recorded as a function of time.

TABLE IV

| Bond Age Minutes | Lap Shear Strength (psi) |
|---|---|
| 20 | 1–2 |
| 60 | 80 |
| 120 | 600 |
| 240 | 1040 |
| 300 | 1520 |
| 24 hours | 2300 |

This example shows that in the absence of a catalyst the adhesive composition requires several hours to cure completely but gives a bond of high strength.

EXAMPLES 15 and 16

The process of Example 1 was repeated, except that no hydroperoxide was added to the chlorosulfonated polyethylene solution in monomers. The effectiveness of an initiator alone and of a combination of an initiator and a promotor were compared by measuring the respective lap shear strengths, shown in Table V.

Table V

| Example | Initiator[1] | Promoter[1] | Lap Shear Strength (psi)[2] |
|---|---|---|---|
| 15 | 1% N,N-dimethylaniline | — | 1400 |
| 16 | 1% N,N-dimethylaniline | 0.4% Cobalt Naphthenate | 2100 |

[1] Based on the weight of chlorosulfonated polyethylene solution in acrylic monomers, as described in the first paragraph of Example 1.
[2] Bonds aged four days at room temperature.

This example shows that although good bonds can be obtained using initiator alone, better bonds are obtained if a promoter is also used.

EXAMPLE 17

An adhesive base solution was prepared by dissolving 100 g of 44.7% chlorinated low-density polyethylene, the polyethylene sold as "Alathon" 3034 by E. I. du Pont de Nemours and Co., Inc., in a mixture of methyl methacrylate (88 g), methacrylic acid (10 g) and ethylene dimethacrylate (2 g). To samples of the solution were added 1 part per 100 (based on total solution) cumene hydroperoxide and 30 mmoles sulfonyl chloride/100 g polymer of the sulfonyl chlorides indicated in the table below. Lap shear adhesive specimens were prepared by applying each solution to 1 inch by 3 inch steel strips which were coated with a light film of a condensation product of butyraldehyde and aniline sold as "Accelerator" 808 by E. I. du Pont de Nemours and Co., Inc., and affixing a similarly treated strip such that a one-square-inch overlap resulted. The assemblies were pressed together in molds which gave uniform bond thicknesses of 0.007—0.010 in.

The specimens were tested one hour after assembly in an Instron apparatus with a separation rate of 0.5 inches per minute (ASTM D-1876-61T). The following lap shear strengths were recorded as the average of four specimens.

Table VI

| Sulfonyl Chloride | 1-Hour Lap Shear Strength |
|---|---|
| None | 160 psi |
| p-Toluenesulfonyl chloride | 2100 psi |
| Methanesulfonyl chloride | 2030 psi |

EXAMPLE 18

An adhesive solution contained 25 wt. percent chlorinated (35 wt. %) high density polyethylene, 7.4 wt. percent methacrylic acid, 2 wt. percent ethylene dimethacrylate and 65.6 wt. percent methyl methacrylate. To the solution was added 1 part per 100 cumene hydroperoxide based on total solution and 67 mmoles of p-toluenesulfonyl chloride per 100 g polymer. Lap shear samples were prepared and tested as described in Example 17. The one-hour lap shear strength was 860 psi. A control sample containing no p-toluene-sulfonyl chloride had 0 lap shear strength.

EXAMPLE 19

To an adhesive base solution containing 39.6 wt. percent chlorinated (41.4%) low-density polyethylene, 52 wt. percent methyl methacrylate, 7.4 wt. percent methacrylic acid and 1 wt. percent ethylene dimethacrylate were added the various amounts of diphenyl ether-4,4-disulfonyl chloride indicated in the table. Test specimens were prepared and tested as in Example 17 and as shown in the table.

Table VII

| Mmoles Sulfonyl Chloride/100 gm. Polymer | 0 | 1 | 10 | 75 | 150 |
|---|---|---|---|---|---|
| Lap Shear Strength | | | | | |
| Condition 1 | 15 psi | 245 | 210 | 95 | 155 |
| Condition 2 | 220 | 2175 | 2385 | not tested | → |
| Condition 3 | nil | nil | 1020 | 830 | 435 |

Condition
1. No cumene hydroperoxide added; duplicate samples.

2. 1 part per 100 cumene hydroperoxide added; same testing as for Condition 1.

3. 1 part per 100 cumene hydroperoxide added. A thin film of the butyraldehyde-aniline adduct of Example 17 was applied to each of two steel strips. The strips were affixed in the jaws of the testing apparatus such that they overlapped one inch. The adhesive solution was applied between the strips, which were then held firmly together by means of two ¾ inch paper clips. (A bond line of 1–2 mils resulted.) The samples were tested four min. after assembly.

In the following composition claims, the term "consisting essentially of" means that, in addition to the recited components, the composition may also contain other components that do not adversely affect the operability of the composition for its intended purpose.

We claim:

1. A method of bonding two surfaces to each other, said method comprising applying to at least one of the surfaces to be joined an adhesive composition consisting essentially of a solution of a sulfur-bearing composition selected from chlorosulfonated polyethylene and a mixture of sulfonyl chloride with chlorinated polyethylene in a polymerizable vinyl monomer and at least one polymerization catalyst selected from the group consisting of an accelerator, an initiator, a promoter, and a free radical generator; the sulfur-bearing composition containing about 25–70 wt. percent chlorine and about 0.1–5 weight percent sulfur and being made from polyethylene having a melt index of about 4–500; said solution having a Brookfield viscosity of up to about 1 million; and then bringing the surfaces sufficiently close together that the adhesive composition fills the gap between the surfaces to create a bond that can be characterized by at least one of the following: the setting time is less than about 10 minutes, the T-peel strength is greater than about 5 pli, the lap shear strength on prepared surfaces is greater than about 2500 psi, and the bond strength on oily surfaces is not significantly adversely affected by the presence of the oil.

2. A method of claim 1 wherein the polymerization catalyst is an organic peroxide or hydroperoxide, and the vinyl monomer is an acrylic monomer.

3. A method of bonding two surfaces to each other, said method comprising applying to at least one of the surfaces to be joined an accelerator; next, applying to at least one of said surfaces an adhesive composition consisting essentially of a solution of sulfur-bearing composition selected from chlorosulfonated polyethylene and a mixture of chlorinated polyethylene and sulfonyl chloride in a polymerizable vinyl monomer and containing at least one member of the group consisting of free radical generators, initiators, and promoters; the sulfur-bearing composition containing about 25–70 wt. percent chlorine and about 3–160 mmoles sulfonyl chloride moiety per 100 g of polymer and being made from polyethylene having a melt index of about 4–500; said solution having a Brookfield viscosity of up to about 1 million; and then bringing the surfaces sufficiently close together that the adhesive composition fills the gap between the surfaces to create a bond that can be characterized by at least one of the following: the setting time is less than about 10 minutes, the T-peel strength is greater than about 5 pli, the lap shear strength on prepared surfaces is greater than about 2500 psi, and the bond strength on oily surfaces is not significantly adversely affected by the presence of the oil.

4. A method of claim 3 wherein the adhesive composition contains an organic peroxide or hydroperoxide free radical generator and the vinyl monomer is an acrylic monomer.

5. A method of claim 3 wherein the accelerator is a primary amine-aldehyde condensation product.

* * * * *